(12) United States Patent
Noda

(10) Patent No.: US 8,679,041 B2
(45) Date of Patent: Mar. 25, 2014

(54) JOINT DRIVE LEG LINK MECHANISM AND WALKING AUXILIARY EQUIPMENT

(75) Inventor: Tatsuya Noda, Wako (JP)

(73) Assignee: Honda Motor Co., Ltd, Tokyo (JP)

(*) Notice: Subject to any disclaimer, the term of this patent is extended or adjusted under 35 U.S.C. 154(b) by 1318 days.

(21) Appl. No.: 12/519,244

(22) PCT Filed: Mar. 21, 2008

(86) PCT No.: PCT/JP2008/055221
§ 371 (c)(1),
(2), (4) Date: Jun. 15, 2009

(87) PCT Pub. No.: WO2008/155936
PCT Pub. Date: Dec. 24, 2008

(65) Prior Publication Data
US 2010/0094182 A1    Apr. 15, 2010

(30) Foreign Application Priority Data
Jun. 20, 2007   (JP) ................. 2007-162361

(51) Int. Cl.
| | | |
|---|---|---|
| A61F 5/37 | (2006.01) |
| A61F 13/00 | (2006.01) |
| A61B 19/00 | (2006.01) |
| A47D 13/04 | (2006.01) |
| A61H 3/00 | (2006.01) |
| A63B 22/00 | (2006.01) |
| A63B 21/00 | (2006.01) |
| A63B 21/02 | (2006.01) |
| A61H 1/00 | (2006.01) |
| A61H 1/02 | (2006.01) |
| A61H 5/00 | (2006.01) |
| A61F 5/00 | (2006.01) |
| A61N 1/00 | (2006.01) |
| A61F 2/74 | (2006.01) |
| B25J 9/18 | (2006.01) |
| G05B 19/19 | (2006.01) |

(52) U.S. Cl.
USPC ............... 601/35; 318/568.11; 318/568.12; 482/66; 482/92; 482/121; 482/124; 601/23; 601/26; 601/27; 601/33; 601/34; 602/5; 602/16; 602/23; 607/2; 623/27; 128/846; 128/869; 128/881; 128/882

(58) Field of Classification Search
USPC .......... 318/568.11, 568.12; 901/2, 14, 15, 16, 901/20, 21–25, 34, 38, 46; 601/23, 26, 27, 601/33–35; 482/66, 124, 92, 121; 607/49, 607/48, 2; 623/27
See application file for complete search history.

(56) References Cited

FOREIGN PATENT DOCUMENTS

JP          03-134345          6/1991
(Continued)

*Primary Examiner* — Patricia Bianco
*Assistant Examiner* — Brandon L Jackson
(74) *Attorney, Agent, or Firm* — Rankin, Hill & Clark LLP

(57) ABSTRACT

A joint drive type link mechanism provided with a link including a joint portion at an intermediary thereof, and a driving source for the joint portion, wherein a link member configuring the link is mounted with the driving source and electric components used for the control of the driving source, in which the link is prevented from being heated by the heat of the electric components is provided. The link member includes an interior space in which the electric components are arranged and has the driving source is arranged thereon with an air inlet connecting to the interior space and an exhaust outlet for exhausting the air passing through the interior space. Further, the interior space is provided with fans as well as a heat sink for cooling the air after air-cooling the electric components.

15 Claims, 7 Drawing Sheets

(56) References Cited

FOREIGN PATENT DOCUMENTS

| | | |
|---|---|---|
| JP | 05-237775 | 9/1993 |
| JP | H5-85584 | 11/1993 |
| JP | 09-323286 | 12/1997 |
| JP | 10-337685 | 12/1998 |
| JP | 2002-154083 | 5/2002 |
| JP | 2007-020909 | 2/2007 |
| JP | 2007-527323 | 9/2007 |
| WO | 2004/096502 | 11/2004 |
| WO | 2006/003847 | 1/2006 |

JOINT DRIVE LEG LINK MECHANISM AND WALKING AUXILIARY EQUIPMENT

BACKGROUND OF THE INVENTION

1. Technical Field

The present invention relates to a joint drive type link mechanism equipped with a link including a joint portion in the intermediary thereof and a driving source for driving the joint portion, and a walking assist device (walking auxiliary equipment) using the link mechanism.

2. Description of the Related Art

Conventionally, there has been known a walking assist device configured from a load transmitting portion, a foot attachment portion to be attached to a foot of a user, and a leg link mechanism provided between the load transmitting portion and the foot attachment portion (for example, refer to Japanese Patent Laid-open No. 2007-20909). In this type of the walking assist device, the leg link mechanism is configured from a joint drive type link mechanism equipped with a leg link including a joint portion in the intermediary thereof and a driving source comprised of an electric motor for driving the joint portion. By driving the joint portion with the driving source, the leg link is actuated in the direction of pushing up the load transmitting portion, so as to support at least a part of a body weight of the user by the leg link via the load transmitting portion.

In the conventional walking assist device mentioned above, an electric component such as a motor driver for use in controlling the driving source is accommodated in a backpack to be worn by a user. However, this makes the user suffer a burden. Therefore, it is desired that the electric component be mounted on the device side in order to reduce the burden of the user.

Here, there has been known a type in which the electric component for use in controlling the driving source for driving the joint is mounted to the link of the joint drive type link mechanism constituting a leg of a walking robot (for example, refer to Japanese Patent Laid-open No. H5-237775). It is conceivable to apply this technology to the leg link mechanism of the above-mentioned walking assist device, and mount the driving source for driving the joint as well as the electric component for use in controlling the driving source to the leg link. In this case, however, there arise inconveniences as listed below. That is, when the electric component is mounted to the leg link, the temperature of the leg link increases by the heat of the electric component due to power distribution. In the walking assist device, the leg link is arranged in the vicinity of the leg of the user, so that the user may feel uncomfortable from the heat affection reaching the leg of the user due to increase in temperature of the leg link.

SUMMARY OF THE INVENTION

In view of the above circumstances, a first object to be solved by the present invention is to provide a joint drive type link mechanism capable of effectively preventing heating of the link which becomes a problem in mounting the electric component to the link. Further, a second object to be solved by the present invention is to provide a walking assist device which uses this joint drive type link mechanism as the leg link so as to prevent the heat affection from reaching the leg of the user.

In order to accomplish the first object mentioned above, according to a first aspect of the present invention, there is provided a joint drive type link mechanism equipped with a link including a joint portion at the intermediary thereof, and a driving source for driving the joint portion, in which the driving source and an electric component for use in controlling the driving source are mounted on the link: wherein the link is provided with an interior space to which the electric component is arranged, is arranged with the driving source at a position of the link located upward in a gravity direction than the location of the electric component, and is provided with an air inlet connecting with the interior space of the link at a position downward in the gravity direction than the location of the electric component, and wherein the driving source is provided with an exhaust outlet for exhausting air passing through the interior space of the link and via the driving source.

Further, in order to accomplish the second object mentioned above, according to a second aspect of the present invention, there is provided a walking assist device configured from a load transmitting portion, a foot attachment portion attached to a foot of a user, and a leg link mechanism provided between the load transmitting portion and the foot attachment portion, in which the leg link mechanism is equipped with a leg link including a joint portion at the intermediary thereof and a driving source for driving the joint portion, and which actuates the leg link in a direction of pushing up the load transmitting portion by driving the joint portion with the driving source so as to support at least a part of a body weight of the user with the leg link via the load transmitting portion, and in which the driving source and an electric component used for the control of the driving source are mounted to the leg link, wherein the leg link mechanism is configured from the joint drive type leg link mechanism according to the first aspect of the invention.

According to the first aspect of the invention, the air is exhausted from the exhaust outlet provided to the driving source positioned upward in the gravity direction by the draft due to heating of the driving source, and the air is introduced from the air inlet positioned downward in the gravity direction into the interior space of the link accompanied by this exhaust. Then, the link functions as a sort of a chimney, and an air flow from the air inlet to the exhaust outlet is generated in the interior space of the link. Therefore, the electric component arranged in the interior space of the link is air-cooled by the air flow so as to prevent heating of the link, and further it becomes possible to also air-cool the driving source. Further, by providing the exhaust outlet to the driving source, it is possible to avoid the need for securing a space for providing the exhaust outlet to the link, so that increase in size of the link may be avoided.

Further, in the first aspect of the invention, a fan may be provided in the interior space of the link at least at either one of a position between the air inlet and the location of the electric component and a position between the location of the electric component and a location of the driving source. By doing so, the electric component may be air-cooled for certain by forcibly flowing the air to the location of the electric component by the fan, even in the case where the cross-sectional area of the air flow channel in the interior space of the link is narrowed at the location of the electric component. Here, if the cross-sectional area of the interior space of the link at the location of the electric component is enlarged, insufficient cooling of the electric component may be prevented even when the fan is omitted. However, this leads to increase in the size of the link. Therefore, in order to secure the air-cooling ability of the electric component without enlarging the link, it is preferable to provide the fan.

Further, in the first aspect of the invention, it is preferable that a heat sink is provided in the interior space of the link at a position between the location of the electric component and the location of the driving source. By doing so, the air with the temperature increased after air-cooling the electric component is cooled by the heat sink. Therefore, the air cooled by the heat sink flows to the driving source, so that the driving source may be air-cooled effectively.

Further, in the first aspect of the invention, when the driving source is configured from an electric motor, it is preferable that the exhaust outlet is provided at a motor cover covering a stator of the electric motor, and the air passing through the interior space of the link is exhausted from the exhaust outlet through a space between the stator and the motor cover. By doing so, the electric motor may be air-cooled by the air flowing inside the space between the stator and the motor cover.

Further, in the first aspect of the invention, when the driving source is configured from the electric motor and is equipped with a reduction gear of a wave gear type connected to the electric motor, it is preferable that the interior space of the link is connected to an interior space of the reduction gear, and a vane portion is provided to a wave generator of the reduction gear for blowing the air toward the electric motor. By doing so, the air is introduced from the interior space of the link by the rotation of the wave generator and is blown towards the electric motor, so that the electric motor may be air-cooled even more effectively. Further, there is no need for attaching a separate air-cool fan to the electric motor, so that downsizing of the driving source may be achieved.

When the vane portion is provided to the wave generator, it is preferable that an interior space of the electric motor in which a coil is arranged connects to the interior space of the reduction gear, and the exhaust outlet for exhausting the air blown by the vane portion of the wave generator via the interior space of the electric motor is provided to the motor cover which covers the stator of the electric motor. By doing so, the coil arranged in the interior space of the electric motor is air-cooled directly, so that the cooling ability of the electric motor may be improved further. Moreover, it is preferable that an air-cool passage for flowing the air blown by the vane portion of the wave generator is formed to the stator of the electric motor, and the exhaust outlet for exhausting the air passing through the air-cool passage is provided to the motor cover which covers the stator. By doing so, the stator may be air-cooled effectively.

According to the walking assist device of the second aspect of the invention, the leg link mechanism is configured from the joint drive type link mechanism according to the first aspect of the invention. Therefore, although the electric component is mounted to the leg link, the electric component is air-cooled by the air flowing in the interior space of the leg link, so that the heating of the leg link may be prevented. By doing so, heat affection from the leg link does not reach the leg of the user, so that the user may use the walking assist device comfortably.

Here, in the second aspect of the invention, in the case where the leg link is configured from a first link member connected at the upper end thereof to the load transmitting portion so as to be able to swing freely in the anteroposterior direction, and a second link member connected to the lower end of the first link member via the joint portion, in which the foot attachment portion is connected to the lower end of the second link member, it is possible to mount the driving source and the electric component to the second link member. However, this causes the position of the center of gravity of the whole leg link to be displaced downwardly. Therefore, the distance between the anteroposterior swing fulcrum of the leg link with respect to the load transmitting portion and the center of gravity of the whole leg link is elongated, and the moment of inertia of the leg link around the swing fulcrum is increased. As a result, the user feels the legs during walking to be heavy by receiving the moment of inertia of the leg link.

In contrast thereto, when the interior space of the link for arranging the electric component therein in the first aspect of the invention and the air inlet are provided to the first link member, and the driving source is arranged to the upper part of the first link member projecting rearward than the leg of the user, the position of the center of gravity of the whole leg link approaches the anteroposterior swing fulcrum of the leg link with respect to the load transmitting portion. Therefore, the moment of inertia of the leg link around the swing fulcrum is decreased, so that it is possible to prevent the user from feeling the legs during walking to be heavy by receiving the moment of inertia of the leg link. Further, because the driving source is arranged rearward than the leg of the user, the air exhausted from the exhaust outlet provided to the driving source flows in a direction opposite to the traveling direction of the user. Therefore, it is possible to prevent the user from feeling uncomfortable by letting the air heated by air-cooling the electric component and the driving source reach the user.

DETAILED DESCRIPTION OF THE PREFERRED EMBODIMENTS

Figure 1:
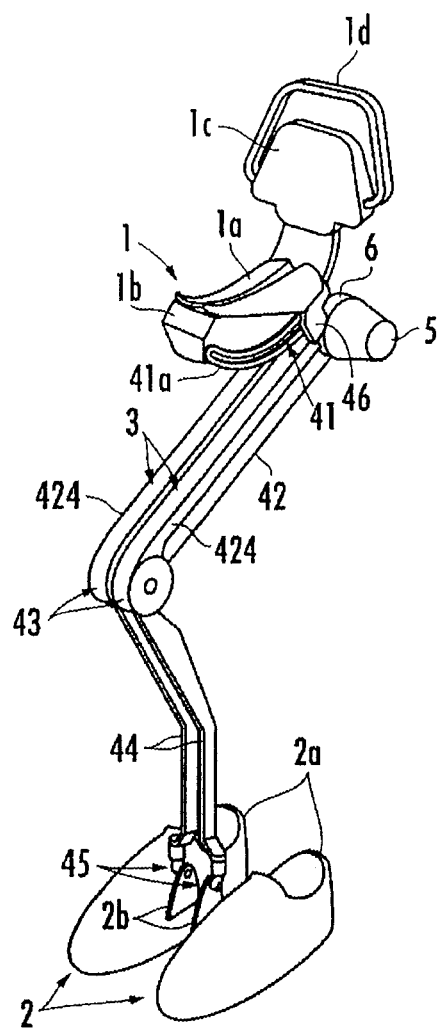
FIG. 1 is a perspective view of a walking assist device according to an embodiment of the present invention.
Figure 2:
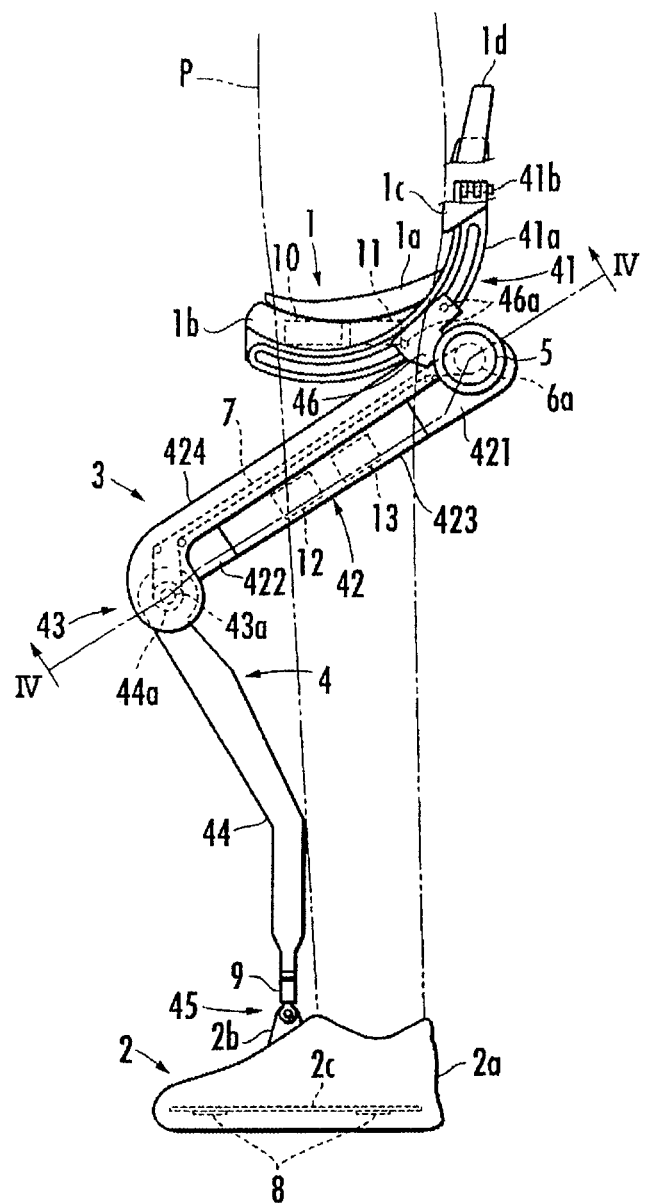
FIG. 2 is a side view of the walking assist device according to the embodiment of the present invention.
Figure 3:
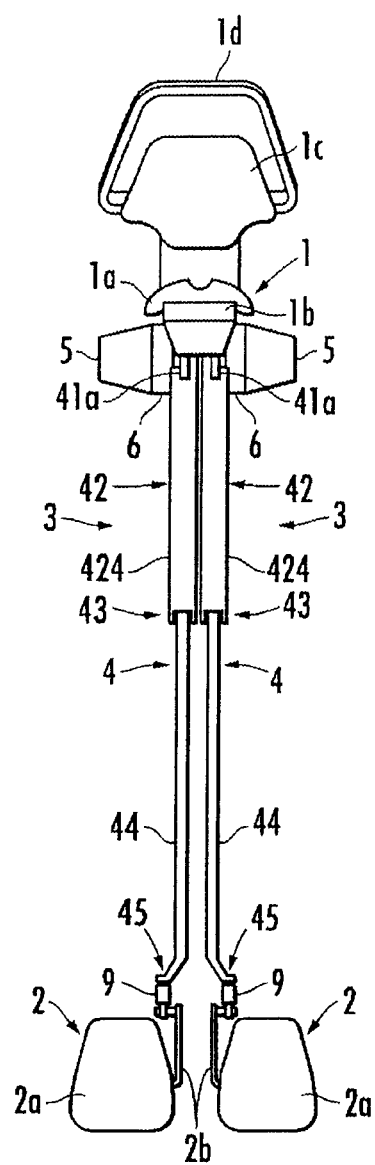
FIG. 3 is a front view of the walking assist device according to the embodiment of the present invention.

Hereinafter, a walking assist device according to an embodiment of the present invention will be described. As illustrated in FIG. 1 to FIG. 3, the walking assist device includes a seat member 1 as a load transmitting member where a user P sits astride, a pair of left and right foot attachment portions 2 and 2 fitted to the left and right feet of the user, and a pair of left and right leg link mechanisms 3 and 3 provided between the seat member 1 and the left and right foot attachment portions 2 and 2.

Each link mechanism 3 is configured from a joint drive type link mechanism equipped with a leg link 4 and an electric motor 5. The leg link 4 is capable of bending and stretching freely, and is configured from a first link member 42 connected to the seat member 1 through a first joint portion 41 at the upper end thereof so as to be able to swing freely in the anteroposterior direction, and a second link member 44 connected to the lower end of the first link member 42 via a rotary type second joint portion 43. The electric motor 5 is a driving source of the second joint portion 43. Further, the foot attachment portion 2 is connected to the lower end of the second link member 44 via a third joint portion 45. Thereby, according to the rotation of the second joint portion 43 driven by the electric motor 5, each leg link 4 is actuated in a stretching direction, that is, in a direction for pushing the seat member 1 upward, so as to generate an assist force to support at least a part of a body weight of the user P (hereinafter, referred to as a body weight relieving assist force). The body weight relieving assist force generated in each leg link 4 is transmitted to the body trunk of the user P via the seat member 1 to relieve the load acted on a leg of the user P.

The seat member 1 is configured from a seat portion 1a, a support frame 1b, and a hip cushion 1c. The seat portion 1a is of a saddle shape to be seated by the user P. The support frame 1b is disposed below the seat portion 1a to support the seat portion 1a. The support frame 1b is configured to extend upward behind the seat portion 1a to form an uprising portion at a rear end thereof. The hip cushion 1c is disposed at the uprising portion. A holding portion 1d of an arch shape is provided to the hip cushion 1c for being held by the user P.

The first joint portion 41 at the upper end of each leg link 4 is further provided with a guide rail 41a of an arc shape, which is connected to the lower side of the seat member 1. Each leg link 4 is movably engaged with the guide rail 41a via a plurality of rollers 46a pivotally attached to a slider 46 which is fixed to the upper end of the first link member 42. In this way, each leg link 4 swings in the anteroposterior direction around the center of curvature of the guide rail 41a. Therefore, the anteroposterior swing fulcrum of each leg link 4 functions as the center of curvature of the guide rail 41a.

Moreover, the upper portion of the first link member 42 protrudes rearward than the leg of the user P. Further, the slider 46 is engaged to the portion of the guide rail 41a which is located rearward than the leg of the user P. By doing so, a forward swing stroke of the leg link 4 following the forward kick of the leg of the user P can be secured without having to elongate the length of the guide rail 41a so much.

Furthermore, the guide rail 41a is pivotally supported at the uprising portion disposed at the rear end of the support frame 1b of the seat member 1 via a spindle 41b which is longitudinal in the anteroposterior direction. Therefore, the guide rail 41a is connected to the seat member 1 so as to be able to swing freely in the lateral direction. Accordingly, each leg link 4 is allowed to swing in the lateral direction, which enables the user P to abduct the legs thereof. In addition, the center of curvature of the guide rail 41a and the axis line of the spindle 41b are both located above the seat portion 1a. Thereby, the seat member 1 can be prevented from inclining greatly in the vertical direction and in the lateral direction when the user P shifts the body weight thereof.

The electric motor 5 is mounted to the first link member 42 in the state connected to a reduction gear 6 of a wave gear type, which will be explained later. An output member of the reduction gear 6, that is, a driving pulley 6a, and a driven pulley 44a which is fixed concentrically with a joint axis 43a of the second joint portion 43 at the second link member 44, are connected via a wrapping transmission member 7, such as a wire, a chain, a belt or the like. Thereby, a driving force output from the electric motor 5 via the reduction gear 6 is transmitted to the second link member 44 via the wrapping transmission member 7 so that the second link member 44 swings around the joint axis 43a with respect to the first link member 42 to bend or stretch the leg link 4.

Each foot attachment portion 2 is composed of a shoe 2a and a connection member 2b which is fixed at the shoe 2a and extends upward. The second link member 44 of each leg link 4 is connected to the connection member 2b via the third joint portion 45 of a 3-axis structure. As illustrated in FIG. 2, a pair of longitudinally disposed pressure sensors 8 and 8, which detect loads acted on the metatarsophalangeal joint (MP joint) and the heel of each foot of the user P, respectively, are attached to the undersurface of an insole 2c provided in the shoe 2a. Moreover, a 2-axis force sensor 9 is built into the second joint portion 43.

Further, the supporting frame 1b of the seat member 1 houses therein a battery 10 and a controller 11. Still further, to the first link member 42 of each leg link 4, there are mounted a sensor amplifier 12 and a motor driver 13, which are electric components used for the control of the electric motor 5. The detection signals from the pressure sensor 8 and the force sensor 9 are amplified by the sensor amplifier 12, and are input to the controller 11. The controller 11 drives the second joint portion 43 of the leg link 4 by controlling the electric motor 5 via the motor driver 13, on the basis of the signals from the pressure sensor 8 and the force sensor 9, and executes the walking assist control which generates the body weight relieving assist force mentioned above.

The body weight relieving assist force, when viewed in the lateral direction, is acted on a connection line (hereinafter, referred to as a reference line) joining a swing fulcrum of the leg link 4 with respect to the first joint portion 41 in the anteroposterior direction and a swing fulcrum of the leg link 4 with respect to the third joint portion 45 in the anteroposterior direction. In the walking assist control, the actual body weight relieving assist force acted on the reference line (accurately, a resultant force between the body weight relieving assist force and a force generated by the self weight of the seat member 1 and each leg link 4) is calculated based on the detected value of a force in a biaxial direction detected by the force sensor 9. Thereafter, on the basis of the detection pressure by the pressure sensor 8 in each foot attachment portion 2, a ratio of the load acted on each foot with respect to the total load acted on both feet of the user P is calculated. Then, a desired control value of the body weight relieving assist force which should be generated for each leg link 4 is calculated by multiplying a predefined value of the body weight relieving assist force by the calculated ratio of the load acted on each foot. Subsequently, the electric motor 5 is controlled so that the actual body weight relieving assist force calculated on the basis of the detected value of the force sensor 9 approximates to the desired control value.

Figure 4:
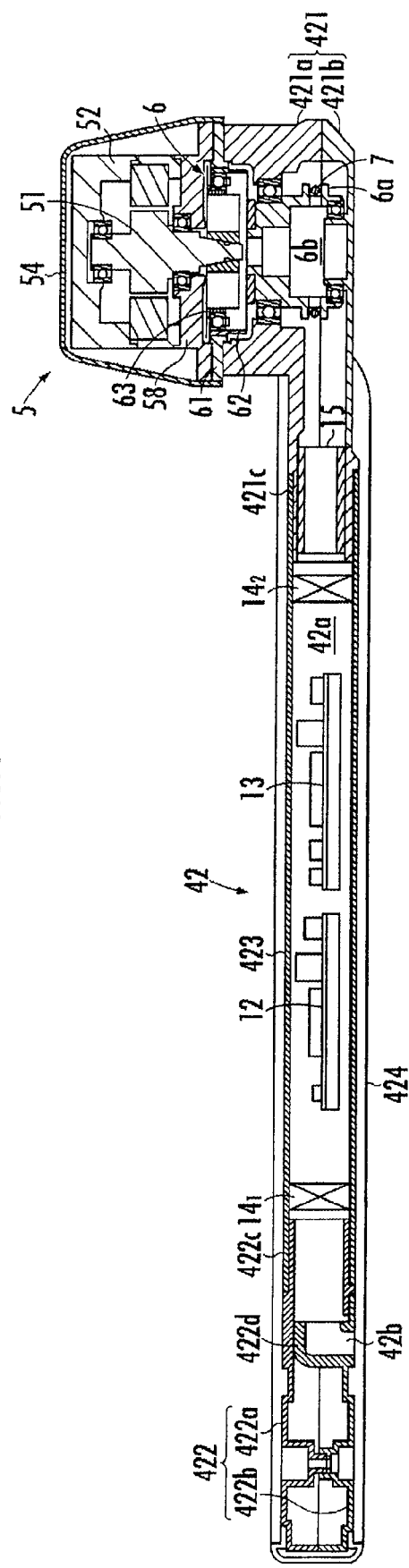
FIG. 4 is a cross-sectional view of a first link member taken along line IV-IV in FIG. 2.
Figure 5:
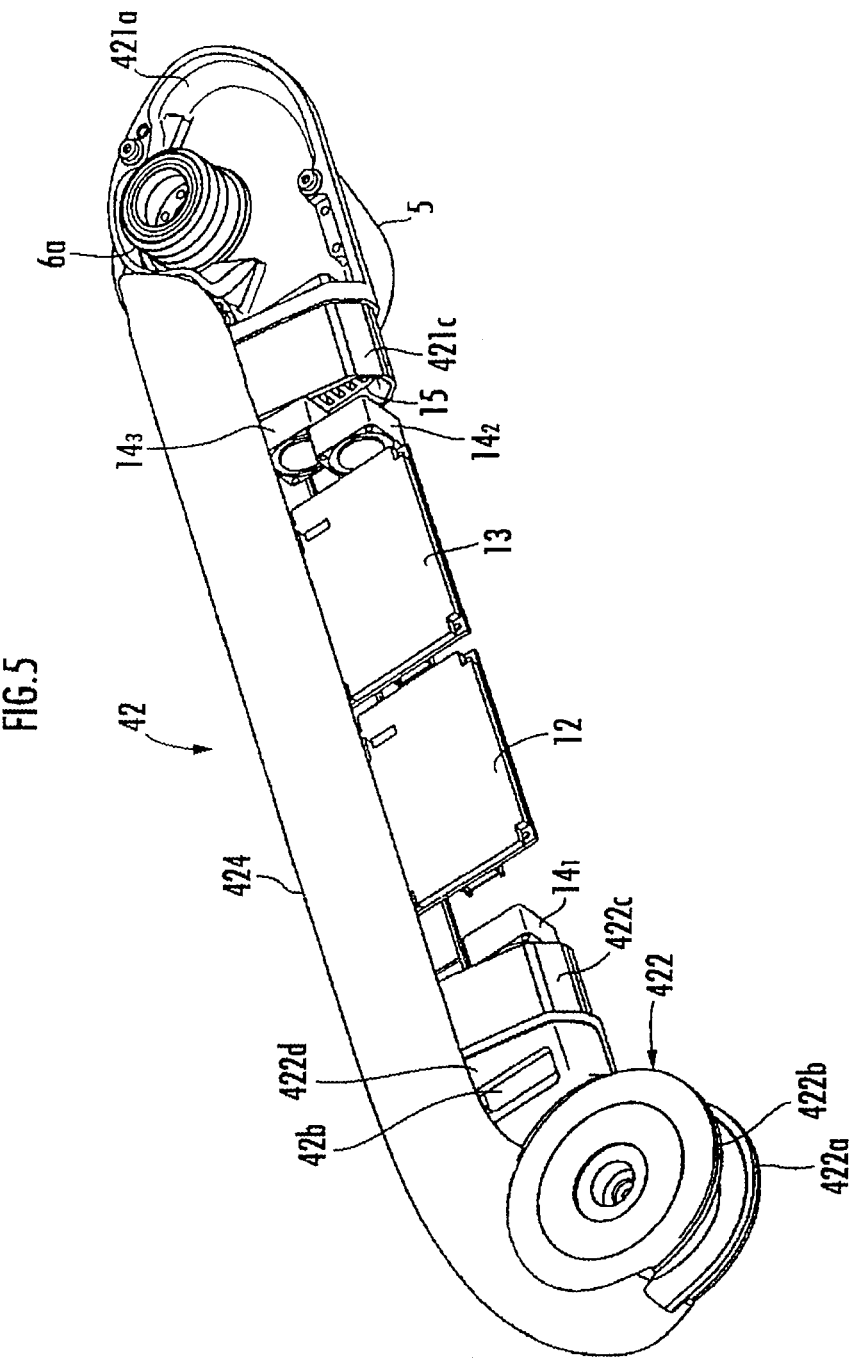
FIG. 5 is a perspective view omitting a part of the constituent members of the first link member therefrom.

Next, with reference to FIG. 4 and FIG. 5, detailed explanation will be given on the first link member 42 of each leg link 4. The first link member 42 is configured from a first case portion 421 at the upper end thereof which becomes the case for the reduction gear 6, a second case portion 422 at the lower end thereof which becomes the case for the second joint portion 43, a connecting tube 423 at the intermediary thereof which connects both of the first and second case portions 421 and 422, and a cover 424 on the upper side of the connecting tube 423 arranged so as to cover the wrapping transmission member 7. The first case portion 421 is configured by combining a laterally outside half portion 421a and a laterally inside half portion 421b, and also the second case portion 422 is configured by combining a laterally outside half portion 422a and a laterally inside half portion 422b. Further, to the outside half portion 421a of the first case portion 421, there is integrally formed a tube portion 421c which is fitted to an upper end of the connecting tube 423, and also to the outside half portion 422a of the second case portion 422, there is integrally formed a tube portion 422c which is fitted to a lower end of the connecting tube 423. Further, to the first link member 42, there is formed by partitioning an interior space 42a starting from the tube portion 422c of the second case portion 422 to the inside of the first case portion 422 via the connecting tube 423 and the tube portion 421c of the first case portion 421. In FIG. 5, the connecting tube 423 and the inner half portion 421b of the first case portion 421 is omitted therefrom.

The sensor amplifier 12 and the motor driver 13 are arranged in the interior space 42a of the first link member 42 at the position of the connecting tube 423. Further, the electric motor 5 is arranged to the outer surface of the first case portion 421 and the reduction gear 6 is arranged inside the first case portion 421, the first case portion 421 being the position of the first link member 42 located upward in the gravity direction than the locations of the sensor amplifier 12 and the motor driver 13. Still further, an air inlet 42b which connects to the interior space 42a of the first link member 42 is provided to the second case portion 422, the second case portion 422 being the position of the first link member 42 located downward in the gravity direction than the locations of the sensor amplifier 12 and the motor driver 13. That is, a block 422d adjacent to the tube portion 422c is integrally formed to the inside half portion 422b of the second case portion 422, and the air inlet 42b connected to the tube portion 422c and opened in the laterally inside direction is formed to the block 422d. By doing so, the air flows into the interior space 42a of the first link member 42, from the laterally inside direction of the second joint portion 43 via the air inlet 42b.

Further, to the interior space 42a of the first link member 42, a first fan $14_1$ is arranged between the air inlet 42b and the locations of the sensor amplifier 12 and the motor driver 13, second and third fans $14_2$ and $14_3$ are arranged between the locations of the sensor amplifier 12 and the motor driver 13 and the location of the electric motor 5, and a heat sink 15 is inserted to the tube portion 421c of the first case portion 421.

Figure 6:
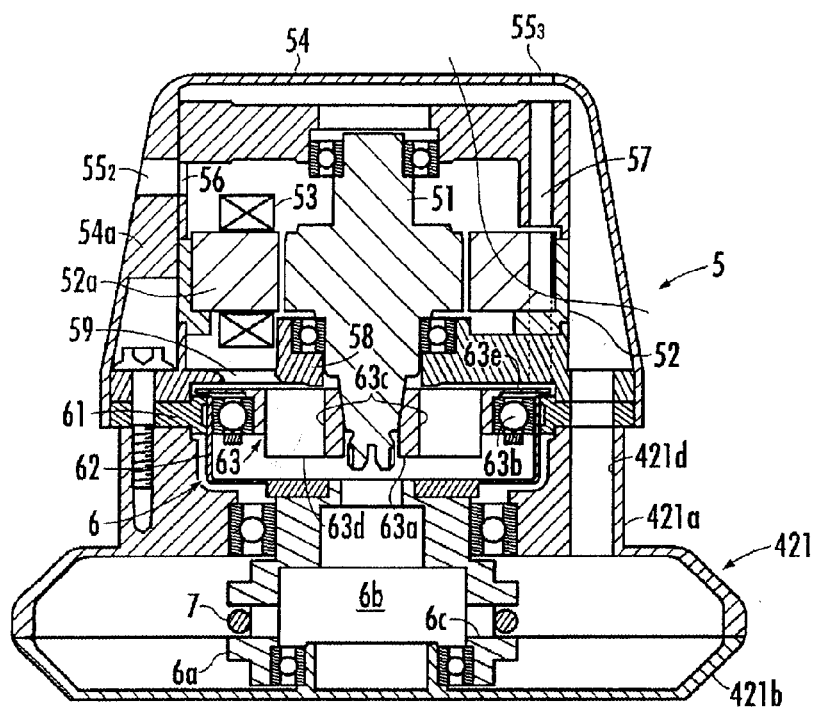
FIG. 6 is an enlarged cross-sectional view of a location of an electric motor and a reduction gear of the first link member.

As shown in FIG. 6, the electric motor 5 is equipped with a rotor 51 and a stator 52 which surrounds the rotor 51. The stator 52 includes to the inner surface thereof a stator core 52a, and a coil 53 is attached to the stator core 52a. Also, a motor cover 54 which covers the stator 52 is provided to the electric motor 5.

Figure 7:
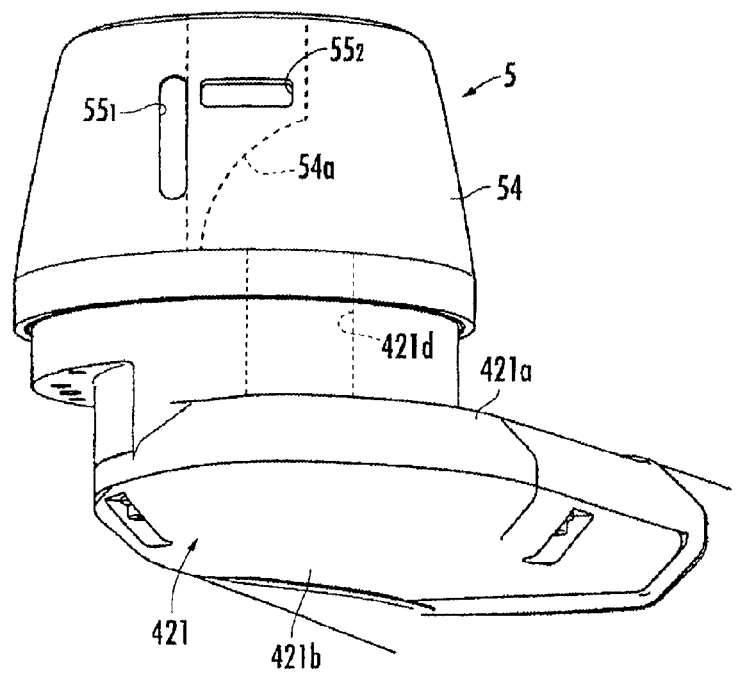
FIG. 7 is a perspective view of the location of the electric motor and the reduction gear of the first link member.
Figure 8:
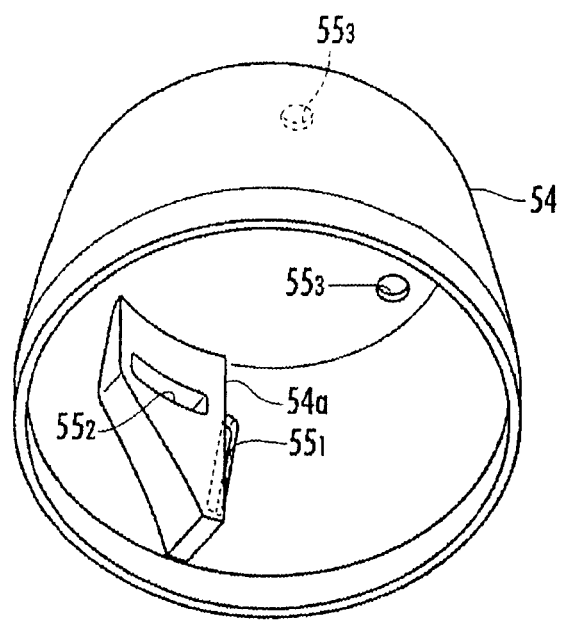
FIG. 8 is a perspective view of a motor cover of the electric motor.

With reference to FIG. 7 and FIG. 8, at one spot in the circumferential direction in the inner circumferential surface of the peripheral wall of the motor cover 54, there is provided a partition wall 54a which contacts the outer peripheral surface of the stator 52. Also, to the motor cover 54, there are opened a first exhaust outlet $55_1$ of a long hole shape longitudinal in the axial direction and adjacent to one side in the circumferential direction of the partition wall 54a, a second exhaust outlet $55_2$ of a long hole shape longitudinal in the circumferential direction and piercing the partition wall 54a in the radial direction, and a plurality of third exhaust outlets $55_3$ of a circular hole shape at the end wall portion of the motor cover 54.

To the outside half portion 421a of the first case portion 421, there is formed a connecting hole 421d which connects the portion inside the first case portion 421 of the interior space 42a of the first link member 42 to the space between the stator 52 and the motor cover 54, at a position on the other side in the circumferential direction of the partition wall 54a. Further, to the stator 52, there are formed a connecting hole 56 which connects the space between the rotor 51 and the stator 52, that is, the interior space to which the coil 53 of the electric motor 5 is arranged, to the second exhaust outlet $55_2$, and an air-cool passage 57 which pierces in the axial direction of the stator 52 at a position opposing the third exhaust outlet $55_3$. Still further, as shown in FIG. 6, to an end piece 58 provided to the end of the electric motor 5 on the reduction gear 6 side, there is formed a connecting hole 59 which connects the interior space of the electric motor 5 to the interior space of the reduction gear 6.

The reduction gear 6 is configured from a wave gear type reduction gear equipped with a highly-rigid internal gear 61 with the teeth provided to the inner circumference thereof, an annular external gear 62 having flexibility and with the teeth provided to the outer circumference thereof, and a wave generator 63 which flexes the external gear 62 elliptically so as to make the external gear 62 partially mesh with the internal gear 61. One gear out of the internal gear 61 and the external gear 62 (the internal gear 61 in the present embodiment) is fixed to the first case portion 421 as the case of the reduction gear 6, and the other gear (the external gear 62 in the present embodiment) is connected to the driving pulley 6a as the output member of the reduction gear 6.

The wave generator 63 is configured from an elliptical cam 63a connected to the rotor 51 of the electric motor 5, and a ball bearing 63b having flexibility and which is fitted to the outer side of the cam 63a. The external gear 62 is flexed elliptically by coming into contact at the inner side thereof with an external ring of the ball bearing 63b, and is meshed with the internal gear 61 at the long axis portion of this ellipse. The position of the mesh is displaced in the circumferential direction in accordance with the rotation of the wave generator 63. In this case, the number of teeth of the external gear 62 is slightly (for example, two) smaller than the number of teeth of the internal gear 61. Therefore, with one rotation of the wave generator 63, the external gear 62, that is, the driving pulley 6a rotates at an angle corresponding to the difference in the number of teeth between the internal gear 61 and the external gear 62.

Figure 9:
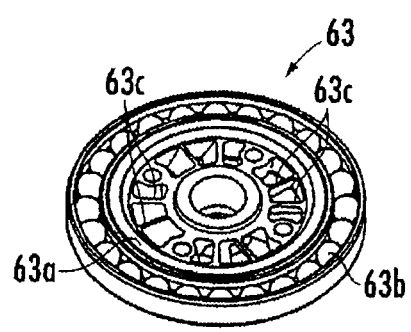
FIG. 9 is a perspective view of a wave generator of the reduction gear.

The interior space of the reduction gear 6 is connected to a portion inside the first case portion 421 of the interior space 42a of the first link member 42 via a penetrating hole 6b formed to the driving pulley 6a. Further, as shown in FIG. 9, to the elliptical cam 63a of the wave generator 63, there are formed a plurality of holes piercing in the axial direction with intervals in the circumferential direction. The dividing portion between each hole constitutes a vane portion 63c which blows air in the axial direction from the interior space of the reduction gear 6 towards the electric motor 5.

When the first through third fans $14_1$, $14_2$, and $14_3$ arranged inside the first link member 42 are operated, the air is introduced from the air inlet 42b and an air flow is generated in the interior space 42a of the first link member 42 from the air inlet 42b to the electric motor 5 side. Then, the sensor amplifier 12 and the motor driver 13 arranged in the interior space 42a of the first link member 42 are air-cooled by this air flow, so that heating of the leg link 4 is prevented. Therefore, heat affection from the leg link 4 does not reach the leg of the user, so that the walking assist device may be used comfortably.

Further, the air with the temperature of which is increased by air-cooling the sensor amplifier 12 and the motor driver 13 is cooled at the heat sink 15, and flows into the space between the stator 52 of the electric motor 5 and the motor cover 54 via the connecting hole 421d. After circulating the space approximately once, the air is exhausted from the first exhaust outlet $55_1$ of the motor cover 54. By doing so, the electric motor 5 is also air-cooled.

Even in the case where the first through third fans $14_1$, $14_2$, and $14_3$ are not provided, air is exhausted from the first through third exhaust outlets $55_1$, $55_2$, and $55_3$ provided to the motor cover 54 of the electric motor 5 positioned upward in the gravity direction by the draft resulting from heating of the electric motor 5, and air is introduced from the air inlet 42b positioned downward in the gravity direction into the interior space 42a of the first link member 42 accompanied by the exhaust. Thereafter, the first link member 42 functions as a sort of a chimney, and an airflow is generated in the interior space 42a of the first link member 42 from the air inlet 42b towards the exhaust outlets $55_1$, $55_2$, and $55_3$. However, the cross-sectional area of the air flow channel in the interior space 42a is narrowed at the locations of the sensor amplifier 12 and the motor driver 13, so that it becomes difficult for the air to flow therethrough. In such case, even when the fans $14_1$, $14_2$, and $14_3$ are omitted, insufficient cooling of the sensor amplifier 12 and the motor driver 13 may be prevented when the cross-sectional area of the interior space 42a at the locations of the sensor amplifier 12 and the motor driver 13 is enlarged. However, this leads to increase in the size of the first link member 42. Therefore, in order to secure the air-cooling ability of the sensor amplifier 12 and the motor driver 13 without enlarging the first link member 42, it is preferable to equip the fans $14_1$, $14_2$, and $14_3$, as in the present embodiment. Further, in the present invention, the first fan $14_1$ is provided between the air inlet 42b and the locations of the sensor amplifier 12 and the motor driver 13, and the second and third fans $14_2$ and $14_3$ are provided between the locations of the sensor amplifier 12 and the motor driver 13 and the location of the electric motor 5. However, it is also possible to omit the first fan $14_1$, or to omit the second and third fans $14_2$ and $14_3$.

When driving the second joint portion 43 by the electric motor 5 via the reduction gear 6, air passing through the heat sink 15 is blown to the electric motor 5 through the interior space of the reduction gear 6, by the operation of the vane portion 63c provided to the wave generator 63 of the reduction gear 6. Thereafter, a part of the air blown to the electric motor 5 flows into the interior space of the electric motor 5 via the connecting hole 59 of the end piece 58, and is exhausted from the second exhaust outlet $55_2$ of the motor cover 54 via the connecting hole 56 formed to the stator 52. Further, the rest of the air blown to the electric motor 5 is exhausted from the third exhaust outlet $55_3$ of the motor cover 54, through the air-cool passage 57 formed to the stator 52. By doing so, the cooling ability of the electric motor 5 may be improved, by air-cooling the coil 53 arranged in the interior space of the electric motor 5 directly, as well as air-cooling the stator 52 effectively. Further, because there is no need for providing a separate air-cool fan connected to the electric motor 5 for air-cooling the electric motor 5, downsizing of the driving source may be achieved.

Moreover, the electric motor 5 is arranged in the first case portion 421 at the upper portion of the first link member 42, which protrudes rearward than the leg of the user P. Therefore, the air exhausted from the first through third exhaust outlets $55_1$, $55_2$, and $55_3$ of the motor cover 54 flows in a direction opposite to the traveling direction of the user P. Therefore, it is possible to prevent the user P from feeling uncomfortable by letting the air heated by air-cooing the electric motor 5 reach the user P.

Although the embodiment of the present invention has been described hereinabove with reference to the drawings, the present invention is not limited thereto. For example, in the above-mentioned embodiment, the driving source comprised of the electric motor 5 and the electric components comprised of the sensor amplifier 12 and the motor driver 13 are mounted in the first link member 42 at the upper side of the leg link 4, but it is possible to mount the driving source and the electric components to the second link member 44 at the lower side of the leg link 4. However, this causes the position of the center of gravity of the whole leg link 4 to be displaced downwardly. Therefore, the distance between the anteroposterior swing fulcrum of the leg link 4 with respect to the seat member 1 (the center of curvature of the arc-shaped guide rail 41a) and the center of gravity of the whole leg link 4 is elongated, so that the moment of inertia of the leg link around the swing fulcrum is increased. As a result, the user P feels the legs during walking to be heavy by receiving the moment of inertia of the leg link 4. In contrast thereto, by arranging the electric components 12 and 13 in the interior space 42a of the first link member 42 as well as arranging the the driving source 5 to the upper portion of the first link member 42 as is in the above-mentioned embodiment, the position of the center of gravity of the whole leg link 4 approaches the anteroposterior swing fulcrum of the leg link 4. Therefore, the moment of inertia of the leg link 4 around the swing fulcrum is decreased, so that it is possible to prevent the user P from feeling the legs during walking to be heavy by receiving the moment of inertia of the leg link 4.

In the above-mentioned embodiment, the leg link 4 is configured as a link capable of bending and stretching freely having a rotary second joint portion 43 disposed at intermediary thereof. But it is acceptable that the leg link is configured as a link capable of extending and contracting freely having a linear motion type second joint portion. In the above-mentioned embodiment, the first joint portion 41 is configured to have an arc-shaped guide rail 41a so as to position the swing fulcrum in the anterposterior direction of each leg link 4 above the seat portion 1a of the seat member 1. However the configuration of the first joint portion is not limited thereto. For example, the first joint portion 41 may be configured as a simply-structured joint portion having a spindle to pivotally support each leg link 4 at the upper end thereof so that each leg link 4 is capable of swinging freely in the anteroposterior direction.

Further, it is possible to configure the load transmitting portion from a harness to be worn around the waist of the user. Moreover, in order to assist walking of a user suffering inconveniences from one of the legs being broken or the like, it is possible to maintain only the leg link mechanism of the left and right leg link mechanism 3 and 3 in the above-mentioned embodiment on the side of the leg of the user facing inconvenience, and omit the leg link mechanism of the other side.

In the above-mentioned embodiment, the joint drive type link mechanism of the present invention is applied to the leg link mechanism 3 of the walking assist device, however, the present invention may be applied widely to joint drive type link mechanism to be used in devices other than the walking assist device.

The invention claimed is:

1. A joint drive type link mechanism configured for use as a leg link in a walking assist device adapted to assist a user in walking, the joint drive type link mechanism equipped with a link including a joint portion at the intermediary thereof, and a driving source for driving the joint portion, in which the driving source and an electric component for use in controlling the driving source are mounted on the link:

wherein the link is provided with an interior space to which the electric component is arranged, is arranged with the driving source at a position of the link located upward in a gravity direction than the location of the electric component, and is provided with an air inlet connecting with the interior space of the link at a position downward in the gravity direction than the location of the electric component, wherein the driving source is provided with an exhaust outlet for exhausting air passing through the interior space of the link via the driving source, and wherein the driving source is configured from an electric motor, is equipped with a reduction gear of a wave gear type connected to the electric motor, and wherein the interior space of the link is connected to an interior space of the reduction gear, and a vane portion oriented in the direction of the electric motor for blowing the air toward the electric motor is provided to a wave generator of the reduction gear.

2. The joint drive type link mechanism according to claim 1, wherein a fan is provided in the interior space of the link at least at either one of a position between the air inlet and the location of the electric component and a position between the location of the electric component and a location of the driving source.

3. The joint drive type link mechanism according to claim 2, wherein a heat sink is provided in the interior space of the link at a position between the location of the electric component and the location of the driving source, the heat sink disposed such that air flow from the fan passes therethrough prior to reaching the driving source.

4. The joint drive type link mechanism according to claim 1, wherein the driving source is provided with the exhaust outlet at a motor cover covering a stator of the electric motor, and wherein the air passing through the interior space of the link is exhausted from the exhaust outlet through a space between the stator and the motor cover.

5. The joint drive type link mechanism according to claim 1, wherein an interior space of the electric motor in which a coil is arranged connects to the interior space of the reduction gear, and the exhaust outlet for exhausting the air blown by the vane portion of the wave generator and after flowing through the interior space of the electric motor is provided to the motor cover which covers the stator of the electric motor.

6. The joint drive type link mechanism according to claim 1, wherein an air-cool passage for flowing the air blown by the vane portion of the wave generator is formed to the stator of the electric motor, and the exhaust outlet for exhausting the air passing through the air-cool passage is provided to the motor cover which covers the stator of the electric motor.

7. The joint drive type link mechanism according to claim 1, wherein a first fan configured to direct an air flow toward the driving source is provided in the interior space of the link at a position between the air inlet and the location of the electric component, a second fan configured to direct an air flow toward the driving source is provided in the interior space of the link at a position between the location of the electric component and a location of the driving source, and a heat sink is provided in the interior space of the link at a position between the second fan and the location of the driving source, the heat sink disposed such that the air flow from the first and second fans passes therethrough prior to reaching the driving source.

8. A walking assist device comprising a load transmitting portion, a foot attachment portion adapted to be attached to a foot of a user, and a joint drive type leg link mechanism provided between the load transmitting portion and the foot attachment portion, in which the joint drive type leg link mechanism is equipped with a leg link including a joint portion at an intermediary thereof, a driving source for driving the joint portion, and an electric component for use in controlling the driving source, and which actuates the leg link in a direction of pushing up the load transmitting portion by driving the joint portion with the driving source so as to support at least a part of a body weight of the user with the leg link via the load transmitting portion, and in which the driving source and the electric component are mounted to the leg link, wherein the leg link of the joint drive type leg link mechanism is provided with an interior space to which the electric component is arranged, is arranged with the driving source at a position of the leg link located upward in a gravity direction relative to a location of the electric component, and is provided with an air inlet connecting with the interior space of the leg link at a position downward in the gravity direction relative to the location of the electric component, wherein the driving source is provided with an exhaust outlet for exhausting air passing through the interior space of the link via the driving source, and wherein the driving source is configured from an electric motor, is equipped with a reduction gear of a wave gear type connected to the electric motor, and wherein the interior space of the leg link is connected to an interior space of the reduction gear, and a vane portion oriented in the direction of the electric motor for blowing the air toward the electric motor is provided to a wave generator of the reduction gear.

9. The walking assist device according to claim 8, wherein a fan is provided in the interior space of the leg link at least at either one of a position between the air inlet and the location of the electric component and a position between the location of the electric component and a location of the driving source.

10. The walking assist device according to claim 9, wherein a heat sink is provided in the interior space of the link at a position between the location of the electric component and the location of the driving source, the heat sink disposed such that air flow from the fan passes therethrough prior to reaching the driving source.

11. The walking assist device according to claim 8, wherein the leg link is configured from a first leg link member connected at an upper end thereof to the load transmitting portion so as to be able to swing freely in the anteroposterior direction, and a second link member connected to a lower end of the first link member via the joint portion, in which the foot attachment portion is connected to a lower end of the second link member, wherein the interior space in which the electric component is arranged and the air inlet are provided to the first link member, and the driving source is arranged to the upper end of the first link member projecting rearward than the leg of the user.

12. The walking assist device according to claim 8, wherein the driving source is provided with the exhaust outlet at a motor cover covering a stator of the electric motor, and wherein the air passing through the interior space of the leg link is exhausted from the exhaust outlet through a space between the stator and the motor cover.

13. The walking assist device according to claim 8, wherein an interior space of the electric motor in which a coil is arranged connects to the interior space of the reduction gear, and the exhaust outlet for exhausting the air blown by the vane portion of the wave generator and after flowing through the interior space of the electric motor is provided to the motor cover which covers the stator of the electric motor.

14. The walking assist device according to claim 8, wherein an air-cool passage for flowing the air blown by the vane portion of the wave generator is formed to the stator of the electric motor, and the exhaust outlet for exhausting the air passing through the air-cool passage is provided to the motor cover which covers the stator of the electric motor.

15. The walking assist device according to claim 8, wherein a first fan configured to direct an air flow toward the driving source is provided in the interior space of the link at a position between the air inlet and the location of the electric component, a second fan configured to direct an air flow toward the driving source is provided in the interior space of the link at a position between the location of the electric component and a location of the driving source, and a heat sink is provided in the interior space of the link at a position between the second fan and the location of the driving source, the heat sink disposed such that the air flow from the first and second fans passes therethrough prior to reaching the driving source.

\* \* \* \* \*